(12) United States Patent
Kundu et al.

(10) Patent No.: US 11,095,528 B2
(45) Date of Patent: Aug. 17, 2021

(54) IDENTITY NETWORK ONBOARDING BASED ON CONFIDENCE SCORES

(71) Applicant: International Business Machines Corporation, Armonk, NY (US)

(72) Inventors: Ashish Kundu, Elmsford, NY (US); Joshua F. Payne, San Antonio, TX (US); Kapil Kumar Singh, Cary, NC (US); Arjun Natarajan, Old Tappan, NJ (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 16/407,788

(22) Filed: May 9, 2019

(65) Prior Publication Data

US 2020/0358662 A1    Nov. 12, 2020

(51) Int. Cl.

| | |
|---|---|
| *G06F 15/173* | (2006.01) |
| *H04L 12/24* | (2006.01) |
| *G06N 20/00* | (2019.01) |
| *H04L 29/08* | (2006.01) |
| *G06F 16/903* | (2019.01) |

(52) U.S. Cl.
CPC ........ *H04L 41/16* (2013.01); *G06F 16/90335* (2019.01); *G06N 20/00* (2019.01); *H04L 41/0893* (2013.01); *H04L 67/02* (2013.01); *H04L 67/10* (2013.01)

(58) Field of Classification Search
CPC ..... H04L 41/16; H04L 41/0893; H04L 67/02; H04L 67/10; G06F 16/90335
See application file for complete search history.

(56) References Cited

U.S. PATENT DOCUMENTS

| | | | |
|---|---|---|---|
| 9,679,258 B2 | 6/2017 | Mnih et al. | |
| 2003/0056138 A1* | 3/2003 | Ren | H04L 45/22 714/4.12 |
| 2004/0078619 A1* | 4/2004 | Vasavada | H04L 45/28 714/4.1 |
| 2005/0086473 A1 | 4/2005 | Barkley et al. | |
| 2007/0073868 A1 | 3/2007 | Nelson et al. | |
| 2010/0128658 A1* | 5/2010 | Bentall | H04L 45/00 370/316 |
| 2013/0267285 A1* | 10/2013 | Kelley | G09B 5/125 463/9 |
| 2013/0331179 A1* | 12/2013 | Taylor | G06F 16/9535 463/29 |

(Continued)

OTHER PUBLICATIONS

P. Mell et al., "The NIST Definition of Cloud Computing", National Institute of Standards and Technology, Information Technology Laboratory, Sep. 2011, pp. 1-7.

*Primary Examiner* — Thanh T Nguyen
(74) *Attorney, Agent, or Firm* — Law Office of Jim Boice

(57) ABSTRACT

A method routes an identity query to a particular identity network. An identity broker determines that a candidate identity network is associated with a confidence score that satisfies predetermined criteria. Responsive to determining that the candidate identity network is associated with the confidence score that satisfies the predetermined criteria, the identity broker onboards the candidate identity network into a set of identity networks services, and then routes an identity query for an identity to the candidate identity network that satisfies the predetermined criteria.

19 Claims, 8 Drawing Sheets

(56) References Cited

U.S. PATENT DOCUMENTS

| | | | |
|---|---|---|---|
| 2013/0346470 A1* | 12/2013 | Obstfeld | G06F 9/5044 |
| | | | 709/202 |
| 2014/0219275 A1* | 8/2014 | Allan | H04L 45/16 |
| | | | 370/390 |
| 2015/0347917 A1 | 12/2015 | Hua et al. | |
| 2016/0301675 A1* | 10/2016 | Wiles | H04L 63/104 |
| 2017/0041454 A1* | 2/2017 | Nicholls | H04L 43/08 |
| 2017/0236121 A1* | 8/2017 | Lyons | G06Q 20/065 |
| | | | 705/71 |
| 2018/0255419 A1* | 9/2018 | Canavor | H04L 63/083 |
| 2020/0192613 A1* | 6/2020 | Brady | G06K 9/00664 |
| 2021/0006459 A1* | 1/2021 | Yeh | H04L 67/10 |

* cited by examiner

IDENTITY NETWORK ONBOARDING BASED ON CONFIDENCE SCORES

BACKGROUND

The present invention relates to the field of identity networks, and specifically to assessing and onboarding identity networks for use by an identity broker. Still more particularly, the present invention relates to assessing and onboarding identity networks based on confidence scores derived from artificial intelligence.

SUMMARY

In an embodiment of the present invention, a method routes an identity query to a particular identity network. An identity broker determines that a candidate identity network is associated with a confidence score that satisfies predetermined criteria. Responsive to determining that the candidate identity network is associated with the confidence score that satisfies the predetermined criteria, the identity broker onboards the candidate identity network into a set of identity networks services, and then routes an identity query for an identity to the candidate identity network that satisfies the predetermined criteria.

In one or more embodiments, the method(s) described herein are performed by an execution of a computer program product and/or a computer system.

DETAILED DESCRIPTION

Figure 1:
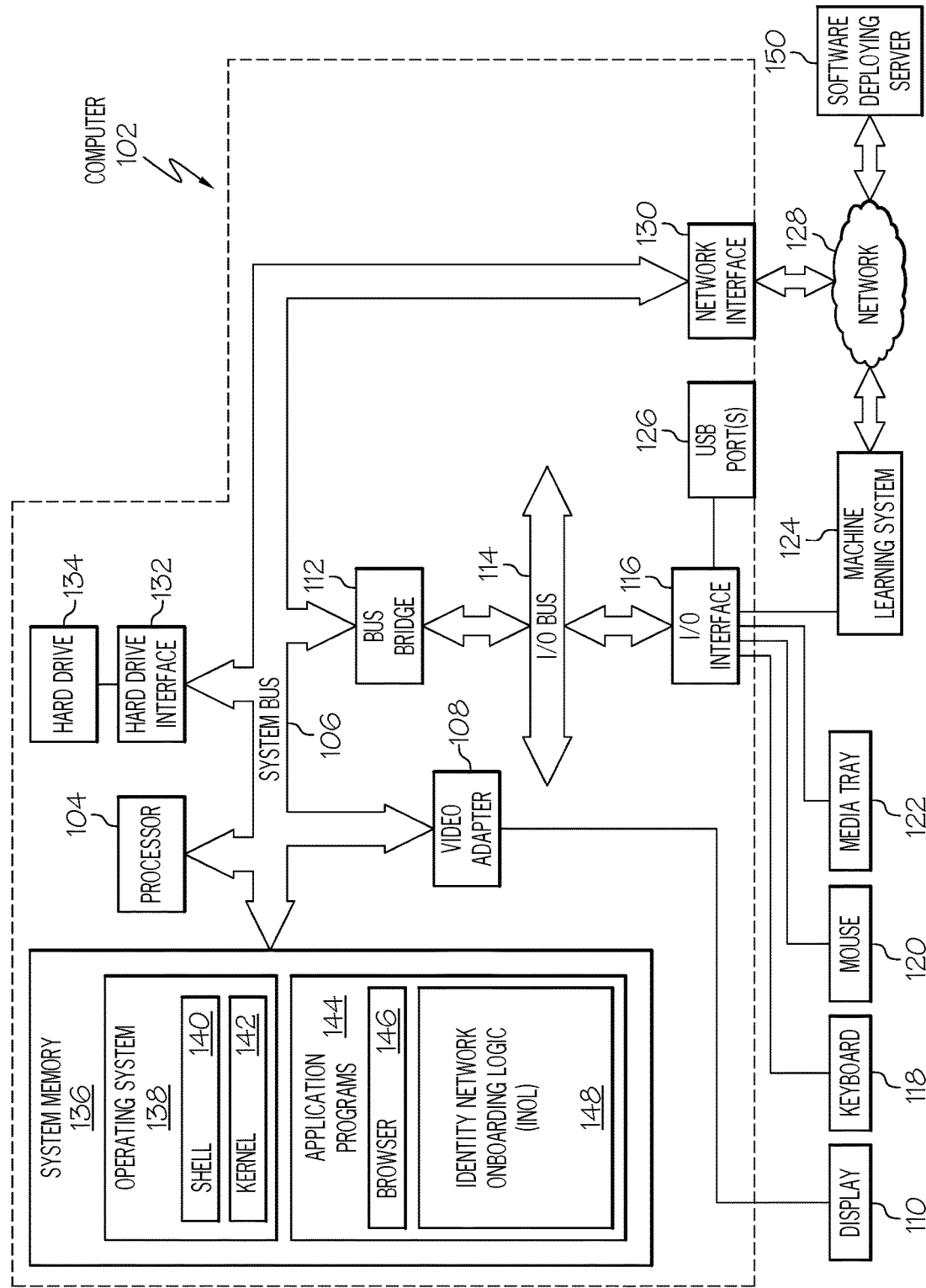
FIG. 1 depicts an exemplary system and network in which the present invention is implemented in one or more embodiments of the present invention.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that is utilized by and/or implemented in one or more embodiments of the present invention. Note that some or all of the exemplary architecture, including both depicted hardware and software, shown for and within computer 102 may be utilized by software deploying server 150 and/or machine learning system 124 shown in FIG. 1, and/or client 202, service provider 204, identity broker 206, identity networks 210a-210n, confidence score server 212, and/or onboarding server 214 shown in FIG. 2, Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a machine learning system 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or the machine learning system 124 using a network interface 130 to a network 128. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Identity Network Onboarding Logic (INOL) 148. INOL 148 includes code for implementing the processes described below, including those described in FIGS. 2-6. In one embodiment, computer 102 is able to download INOL 148 from software deploying server 150, including in an on-demand basis, wherein the code in INOL 148 is not downloaded until needed for execution. Note further that, in one embodiment of the present invention, software deploying server 150 performs all of the functions associated with the present invention (including execution of INOL 148), thus freeing computer 102 from having to use its own internal computing resources to execute INOL 148.

Also connected to (or alternatively, as part of) computer 102 is a machine learning system 124. In exemplary embodiments of the present invention, machine learning system 124 is a Deep Neural Network (see FIG. 4), an unsupervised reinforcement learning system (see FIG. 5) or another type of heuristic artificial intelligence.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention. For example, and with specific regard to a server as used in one or more embodiments of the present invention, computer 102 is lacking elements such as irrelevant components such as video adapter 108, keyboard 118, etc., but includes elements (not shown) such as graphics processing units, co-processors for various functions (e.g., dedicated to certain arithmetic processes), etc.

As used herein, an identity is defined as a record that includes identification information about a particular entity. An exemplary entity is a person, although the present invention is also applicable for providing an identity of a device, a software program, etc. The terms "identity", "identity profile", "identity file" and "identity record" are used interchangeably herein to denote an "identity".

In order to provide a service to a particular user, a service provider must often have the identity profile of a requesting person. For example, if a person asks a banking system "How much money do I have?", the banking system must have the identity profile of that person in order to answer the question. In various scenarios, the identity profile is the name of the person, his/her account number, and/or other identifying information for that person. As such, the person desires that the service provider is given an accurate version of his/her identity profile.

While such an identity profile is necessary by a single service provider, an identity profile is also needed in a federated service system. That is, a federated service system is a collection of services, resources, etc. that share a particular person's identity profile among themselves, even if in various formats. In various embodiments of the present invention, these service providers are homogenous service providers that provide a same type of resource/service, while in other embodiments, these service providers are heterogeneous service providers that provide disparate types of resources/services.

For example, and in an embodiment of the present invention, assume that the federated service system is a set of email servers, described for explanatory purposes as "Email server A", "Email server B", and "Email server C". Assume further that a user has email accounts in all three email servers, but wants to just sign in once. As such, the user will provide his/her identity profile (e.g., user@emailserviceA) to the Email server A. Thereafter, an identity broker will share the identity profile of that user with Email server B and/or Email server C, but after converting the identity profile into a format used by Email server B and/or Email server C. That is, the identity broker will provide Email server B with the identity profile user@emailserviceB and/or Email server C with the identity profile user@emailserviceC. Thus, the user only has to provide his/her identity profile (user@emailserviceA) to Email server A, and is automatically signed in to Email server B and Email server C. As such, the system obtains the user's identity from a first identity network (e.g., that used by Email server A), and then obtains other versions/copies of the user's identity from a second identity network (e.g., that used by Email server B) and a third identity network (e.g., that used by Email server C).

In another example, and in an embodiment of the present invention, assume that the federated service system is a system that provides a set of webpages, which are provided by one or more webpage servers. Assume further that the system has obtained his/her identity profile for Webpage A, and that the user would also like to provide his/her identity profile to Webpage B and/or Webpage C. Rather than simply using cookies, which are unsecure, this embodiment uses an identity broker to provide the same identity profile, either in a same format or in different formats as required by Webpage B and/or Webpage C, to the webpage server(s) that provide Webpage B and/or Webpage C.

In another example, and in an embodiment of the present invention, assume that the federated service system includes a first network, which is accessible to a particular user when he/she provides his/her identity profile to that first network. Assume further that this particular user also desires to access a second network and/or a third network, which are also part of the federated service system. As such, rather than this particular user directly providing his/her identity profile to the second network and/or the third network, an identity broker will provide the identity profile of this particular user to the second network and/or the third network, thus allowing this particular user to access the second network and/or the third network.

In another example, and in an embodiment of the present invention, assume that the federated service system includes a first database, which is accessible to a particular user when he/she provides his/her identity profile to a first database server that manages that first database. Assume further that this particular user also desires to access a second database and/or a third database, which are also part of the federated service system, and which are respectively provided by a second database server and a third database server. As such, rather than this particular user directly providing his/her identity profile to the second database server and/or the third database server, an identity broker will provide the identity profile of this particular user to the second database server and/or the third database server, thus allowing this particular user to access the second database and/or the third database.

In one or more embodiments, the present invention not only allows a particular user to access one or more resources (e.g., resources found in a federated service system), but also assesses the validity of identities found in the different identity networks. That is, the federated service systems share identities among themselves by sending a trusted identity profile to another resource. However, the identities shared by the identity networks may or may not be trustworthy. Therefore, one or more embodiments of the present invention present a new and useful process, that goes beyond known and/or obvious processes, for determining how confident the system is about the accuracy of identities that are shared between identity networks. This confidence is described in a confidence score.

Figure 2:
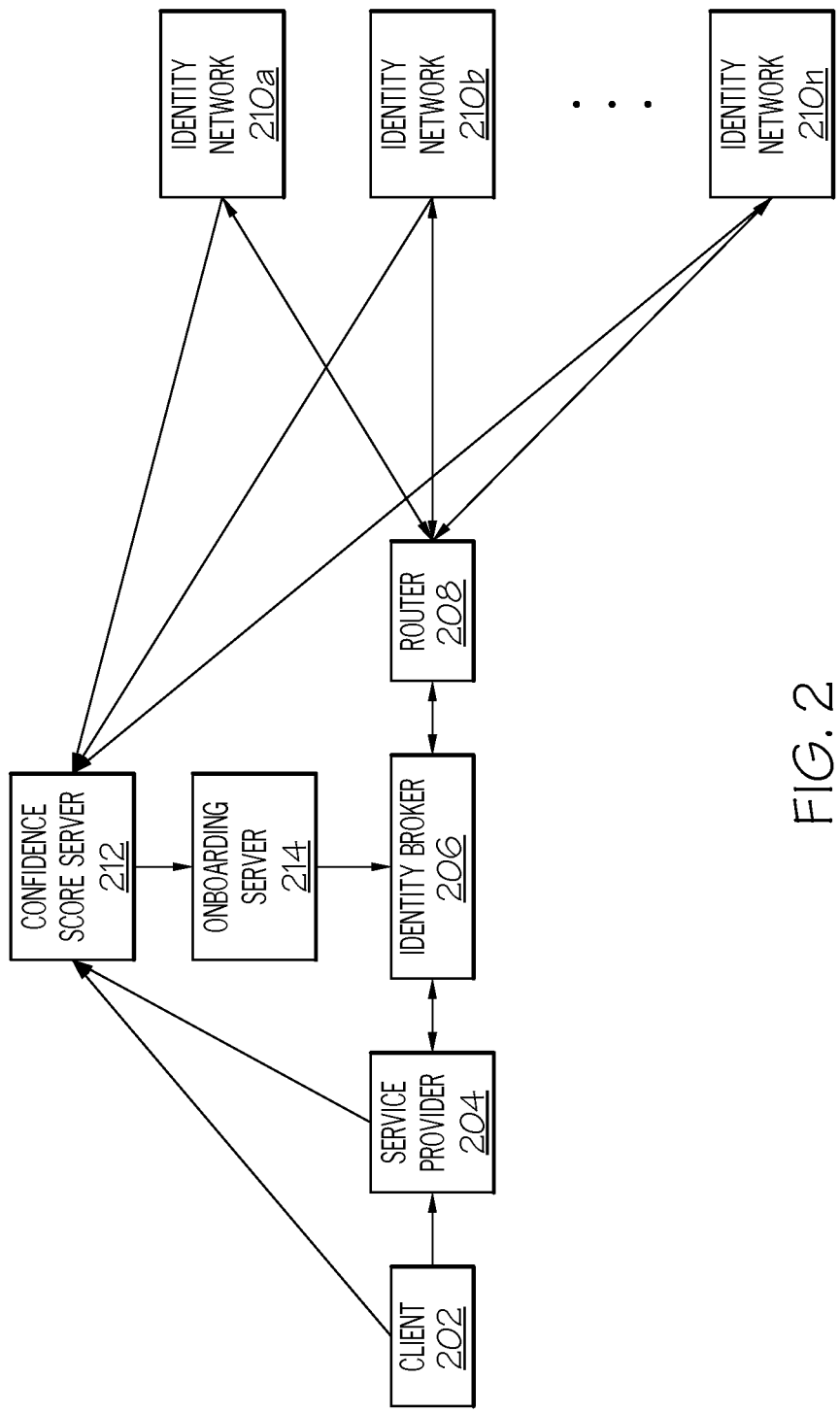
FIG. 2 illustrates a high-level overview of one or more embodiments of the present invention.

With reference now to FIG. 2, an overview showing how one or more embodiments of the present invention validates an identity profile from one or more identity networks is presented.

As shown in FIG. 2, assume that a message is sent by a particular user from a client 202 requesting resources, services, etc. from a service provider 204, such as a webpage server, an email server, an enterprise network, a database server, etc. Assume further that the service provider 204 is not "sure" who is requesting the service. This insecurity can be a result of a typographical error when the user submits his/her identity profile, a missing identification field when the user's identity profile is submitted, etc. As such, the user of client 202 has pre-approved the identity broker 206 to act as his/her agent, in order to obtain the identity information needed to access the service provider 204.

In order for the identity broker 206 to be able to provide a valid identity profile for the user to the service provider, the present invention obtains one or more identities from one or more of the identity networks 210a-210n (where "n" is an integer), which provide identity networks services. That is, one or more of the identity networks 210a-210n is able to supply an identity profile of the user (i.e., a set of data that includes the name, address, date of birth, etc. specific for that user). However, one or more of the identity networks 210a-210n might not be good candidates for providing such identity information, based on their confidence score that is generated by a confidence score server 212 (which in various embodiments of the present invention is separate from or part of the identity broker 206).

This confidence score is based in part on the overall trustworthiness of the identity networks 210a-210n themselves, and/or the validity of the identity profile records held in the identity networks 210a-210n. The overall trustworthiness of the identity networks 210a-210n and the validity of the identity profile records held in the identity networks 210a-210n are referred to herein as "the network specific variables", which include a base confidence score, a similarity score, and a fraud score for each of the identity networks 210a-210n.

The base confidence score is established for a particular person by each of the identity networks 210a-210n. That is, the base confidence score rates how confident each of the identity networks 210a-210n is that it contains an accurate identity profile for a particular person. For example, assume that each of the identity networks 210a-210n has an internal policy for establishing how certain they are about the accuracy of identities that they contain. Such a policy could be that an identity profile comes from a trusted input by the particular person, from a trusted enterprise, etc. If the input source is well known to a particular identity network from the identity networks 210a-210n, then the base confidence level for the identity profile of that particular person will be at a highest level. However, if the source of the identity profile is unknown or untrusted by the particular identity network, then the base confidence level will be lower.

Furthermore, if this identity information has been confirmed (e.g., from one of the other identity networks 210a-210n and/or another identity profile source, such as a governmental database), then the base confidence level for the identity profile of that particular person will be raised.

Furthermore, if a particular identity network has more than a predefined quantity of identity profiles, and the average confidence level of its identity profiles is greater than a predefined level (e.g. greater than 0.5), then the base confidence score for that particular identity network will be higher than the base confidence score of another identity network that has fewer and/or less trustworthy identity profiles.

An exemplary threshold base confidence level is defined as a base confidence score that is above a predefined level (e.g., 0.5 on a scale of 0.0 to 1.0), thus indicating that there is at least a 50% likelihood that a particular identity network is certain that is contains an accurate identity profile for a user of the client 202.

The similarity score is based on how similar an identity profile for a particular person is between the different identity networks 210a-210n. For example, if an identity profile for a particular person is exactly the same in all of the identity networks 210a-210n, then the similarity score for the identity profile of that particular person will be at a highest level. However, if some of the information in the various identity profiles is missing or differs in the identity networks 210a-210n, then the similarity score will be lower. An exemplary similarity score level is defined as a similarity score that is above a predefined level (e.g., 0.5 on a scale of 0.0 to 1.0), thus indicating that there is at least a 50% match of information for a particular identity file in a particular identity network for a user of the client 202 as compared to other identity files for that user in other identity networks from identity networks 210a-210n.

The fraud score is based on a fraud record of each of the identity networks 210a-210n. For example, if there is a record (e.g., from an independent third-party monitoring service) of a particular identity network from the identity networks 210a-210n having a history of providing inaccurate identity information, then the fraud score will be high (where a high score indicates high history of fraudulent identity records and a low score indicates a low history of fraudulent identity records). An exemplary threshold fraud level is defined as a fraud score that is above a predefined level (e.g., 0.5 on a scale of 0.0 to 1.0), thus indicating that there is at least a 50% likelihood that identities held in a particular identity network are not fraudulent.

Thus, the base confidence score, the similarity score, and/or the fraud score combine to define network specific variables that describe a state of each of the identity networks from identity networks 210a-210n.

Beside using network specific variables to determine which identity network the identity broker 206 should use, one or more embodiments of the present invention utilize standard variables, which are associated with criteria that describe a state of an identity request and/or an identity requester of an identity profile.

In one or more embodiments of the present invention, standard variables include one or more of a cost of connecting to an identity network, an importance of a query for an identity profile, a time requirement of the query for an identity profile, a confidence level about the requester, a type of information needed as part of the identity profile, other potential identity network candidates and their specifications, a provenance of identity networks with respect to success of queries, and derivatives of success of queries.

A cost of connecting to an identity network is defined as the monetary cost of the identity broker 206 connecting to one or more of the identity networks 210a-210n shown in FIG. 2. That is, each query can have a maximum amount that the person and/or service provider 205 making the identity query is willing to pay.

An importance of a query for an identity profile is defined by the client 202 and/or the service provider 204. That is, a query is assigned a particular level of importance that needs to be met in order to look for an identity profile. For example, if the identity/identity profile is needed to provide emergency medical treatment to a particular user (by the service provider 204), then this is much more important (and thus has a higher numeric value) that if the identity is needed to send an advertisement for a recreational product to a particular user.

A time requirement of the query for an identity indicates how time sensitive the need for the identity is. Using the example of emergency medical treatment versus receiving a generic advertisement for a product, the time sensitivity for obtaining an identity in order to provide the emergency medical treatment is much greater, and thus has a higher score.

A confidence level about the requester is a value that described how certain the service provider 204 and/or the identity broker 206 are about the person who is requesting an identity/identity profile for himself/herself. That is, if the service provider 204 and/or the identity broker 206 have a relationship with the client 202 (e.g., a history of obtaining identities for the client 202, or that the request for the identity has come encrypted, using an encryption key that the client 202 shares with the service provider 204 and/or the identity broker 206), then the service provider 204 and/or the identity broker 206 are confident in that the person requesting his/her identity is who he/she says he/she is.

A type of information needed as part of the identity includes information types such as business records, medical records, etc. that are associated with the name, address, birth date, etc. of the requester. Thus, the type of information being requested is another indication of how important the information is, thus affecting the standard variables.

Other potential identity network candidates and their specifications refers to how many identity networks are available. For example, if only one candidate identity network is available, then the requester is likely not going to be able to determine how accurate the identities from that identity network are, thus affecting (lowering) the standard variables.

A provenance of identity networks with respect to success of queries, and derivatives of success of such queries, describes how useful/accurate the past use of certain sets of identity networks have been. As such, the more useful and accurate the past use, the higher the standard variables.

The confidence score server 212 thus generates, based on the standard variables, the overall trustworthiness of the identity networks 210a-210n themselves, and/or the validity of the identity files held in the identity networks 210a-210n, an overall confidence score for each of the identity networks 210a-210n to provide identity information about the user of the client 202b. In various embodiments of the present invention, this overall confidence score is a number, a vector, and/or a text report.

If the confidence score generated by the confidence score server 212 meets a predefined threshold (e.g., is above a certain value), then it recommends that one or more candidate identity networks be on-boarded (e.g., added to) the set of identity networks 210a-210n for use by the user of client 202 and/or service provider 204.

Figure 3:
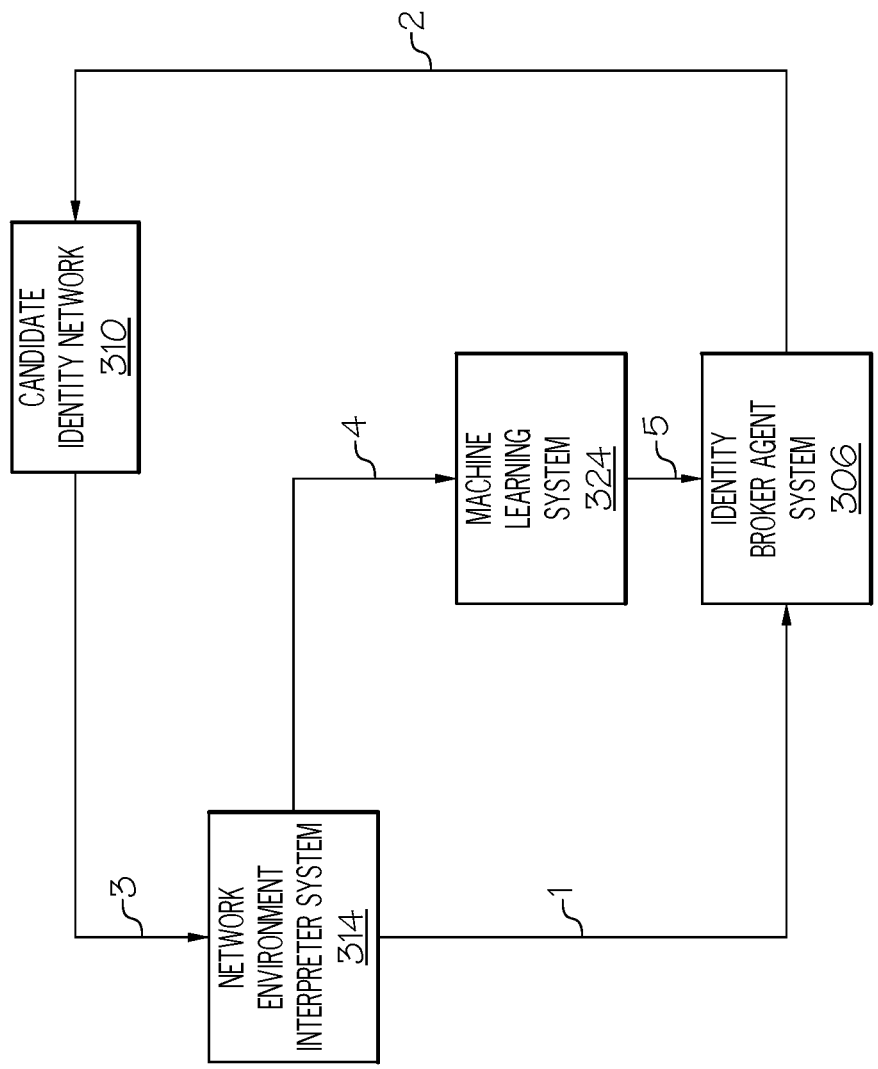
FIG. 3 depicts an exemplary process for onboarding a candidate identity network in accordance with one or more embodiments of the present invention.

In one or more embodiments of the present invention, the decision by the onboarding server 214 to onboard a particular identity network onto the identity networks 210a-210b is achieved using reinforcement learning, as described in FIG. 3.

As shown in FIG. 3, a network environment interpreter system 314 (analogous to onboarding server 214 shown in FIG. 2), sends the standard variables and the requirements for the overall trustworthiness of the identity networks and validity of the identity records to an identity broker agent system 306 (analogous to identity broker 206 shown in FIG. 2), as depicted in step 1.

As shown in step 2 in FIG. 3, the identity broker agent system 306 then interrogates a candidate identity network 310 (i.e., an identity network that is being considered for onboarding to the set of identity networks 210a-210n shown in FIG. 2, which provide identity networks services), in order to determine how well the candidate identity network 310 meets the requirements described in the standard variables and the requirements for the overall trustworthiness of the identity networks and validity of the identity records.

As shown in step 3 in FIG. 3, the candidate identity network 310 provides details about its capabilities, identity records/profiles it contains, history of success and/or fraud, etc. to the network environment interpreter system 314.

As shown in step 4 in FIG. 3, in order to determine how well the candidate identity network 310 meets the standard variables and the requirements for the overall trustworthiness of the identity networks and validity of the identity records, based on the provided details about the capabilities, contained identity records/profiles, history of success and/or fraud, etc. of the candidate identity network 310, this information is sent to a machine learning system 324 (analogous to machine learning system 124 shown in FIG. 1). In an embodiment of the present invention, machine learning system 324 is a neural network.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a Deep Neural Network (DNN), electronic neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

Figure 4:
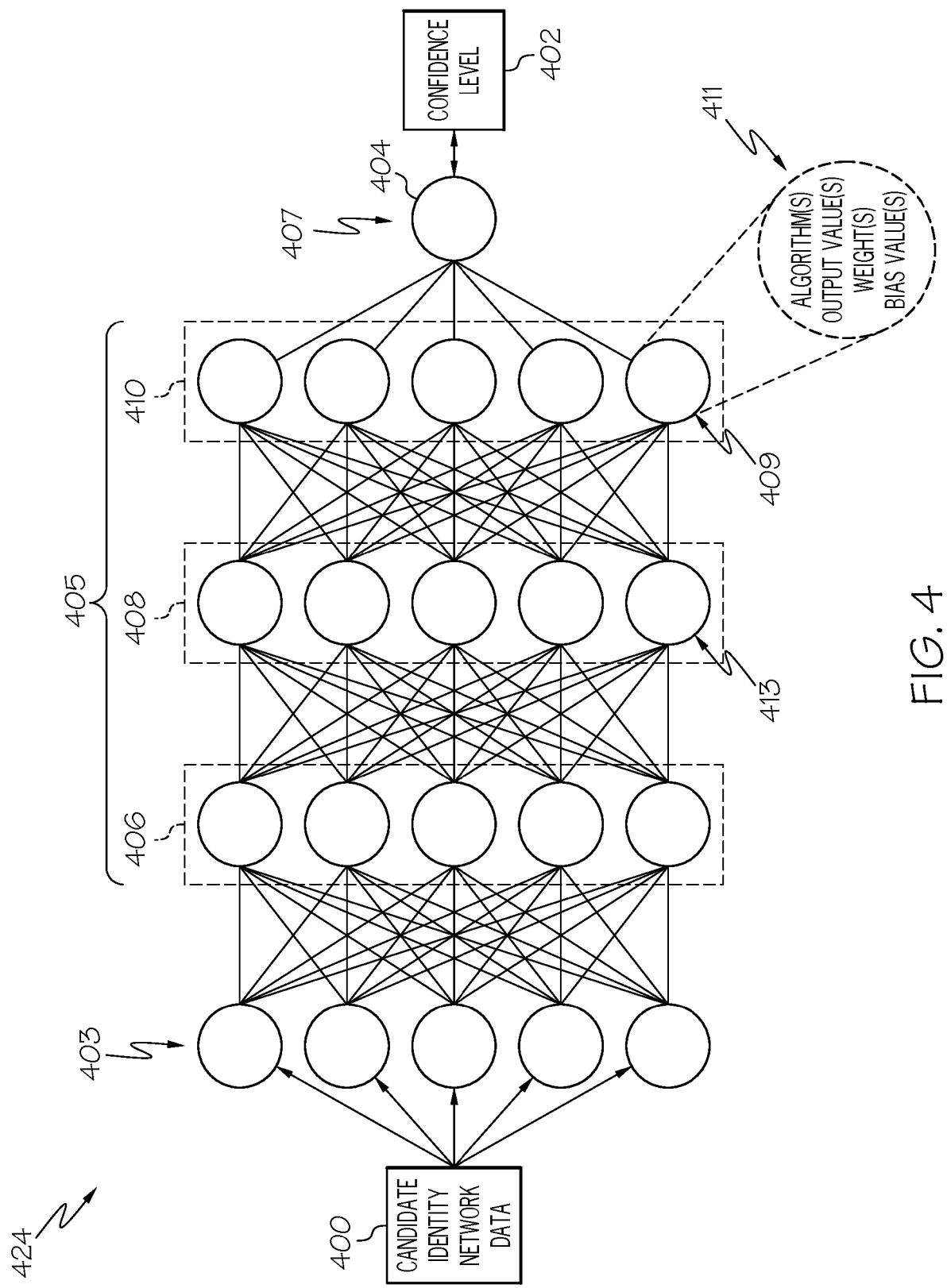
FIG. 4 illustrates an exemplary Deep Neural Network (DNN) as used in one or more embodiments of the present invention.

With reference now to FIG. 4, a Deep Neural Network (DNN) 424 (analogous to machine learning system 324 shown in FIG. 3) used to evaluate data in one or more embodiments of the present invention is presented. For example, candidate identity network data 400 is data that describes a particular candidate network (e.g., candidate identity network 310 shown in FIG. 3). In one or more embodiments of the present invention, the candidate identity network data 400 includes the standard variables for a request of an identity, the overall trustworthiness of the candidate identity network, and the validity of the identity files held in the candidate identity network. DNN 424 is a neural network that interprets these variables/features in order to determine whether or not the candidate identity network is appropriate for onboarding into the set of identity networks 210a-210n shown in FIG. 2.

The electronic neurons (also referred to herein simply as "neurons" or "nodes") in DNN 424 are arranged in layers, known as an input layer 403, hidden layers 405, and an output layer 407. The input layer 403 includes neurons/nodes that take input data, and send it to a series of hidden layers of neurons (e.g., hidden layers 405), in which neurons from one layer in the hidden layers are interconnected with all neurons in a next layer in the hidden layers 405. The final layer in the hidden layers 405 then outputs a computational result to the output layer 407, which is often a single node for holding vector information. In an embodiment of the present invention, each neuron in the output layer 407 is associated with a particular label 402, as shown in FIG. 4.

As just mentioned, each node in the depicted DNN 424 represents an electronic neuron, such as the depicted neuron 409. As shown in block 411, each neuron (including neuron 409) functionally includes at least three features: a mathematical function, an output value, a weight, and a bias value.

The mathematical function is a mathematic formula for processing data from one or more upstream neurons. For example, assume that one or more of the neurons depicted in the middle hidden layers 405 send data values to neuron 409. Neuron 409 then processes these data values by executing the mathematical function shown in block 411, in order to create one or more output values, which are then sent to another neuron, such as another neuron within the hidden layers 405 or a neuron in the output layer 407. Each neuron also has a weight that is specific for that neuron and/or for other connected neurons. Furthermore, the output value(s) are added to bias value(s), which increase or decrease the output value, allowing the DNN 424 to be further "fine tuned".

For example, assume that neuron 413 is sending the results of its analysis of a piece of data to neuron 409. Neuron 409 has a first weight that defines how important data coming specifically from neuron 413 is. If the data is important, then data coming from neuron 413 is weighted heavily, and/or increased by the bias value, thus causing the mathematical function (s) within neuron 409 to generate a higher output, which will have a heavier impact on neurons in the output layer 407. Similarly, if neuron 413 has been determined to be significant to the operations of neuron 409, then the weight in neuron 413 will be increased, such that neuron 409 receives a higher value for the output of the mathematical function in the neuron 413. Alternatively, the output of neuron 409 can be minimized by decreasing the weight and/or bias used to affect the output of neuron 409. These weights/biases are adjustable for one, some, or all of the neurons in the DNN 424, such that a reliable output will result from output layer 407. In one or more embodiments of the present invention, finding the values of weights and bias values is done automatically by training the neural network. In one or more embodiments of the present invention, manual adjustments are applied to tune the hyperparameters such learning rate, dropout, regularization factor and so on. As such, training a neural network involves running forward propagation and backward propagation on multiple data sets until the optimal weights and bias values are achieved to minimize a loss function. The loss function measures the difference in the predicted values by the neural network and the actual labels for the different inputs.

When manually adjusted, the weights are adjusted by the user, sensor logic, etc. in a repeated manner until the output from output layer 407 matches expectations. For example, assume that input layer 403 receives inputs that describe a mountain apple. In an exemplary input, the input to input layer 403 contains values that describe a mountain apple. If DNN 424 has been properly trained (by adjusting the mathematical function (s), output value(s), weight(s), and biases in one or more of the electronic neurons within DNN 424) to output a vector/value to the output layer 407, indicating that the neuron 404 that is associated with the label 402, which describes the confidence level of the candidate network, assuming that the input layer 403 and the hidden layers 405 have been properly trained to evaluate candidate identity networks.

When automatically adjusted, the weights (and/or mathematical function) are adjusted using "back propagation", in which weight values of the neurons are adjusted by using a "gradient descent" method that determines which direction each weight value should be adjusted to. This gradient descent process moves the weight in each neuron in a certain direction until the output from output layer 407 improves (e.g., accurately describes the confidence level of any candidate identity network, including but not limited to the candidate identity network 310 shown in FIG. 3).

As shown in FIG. 4, various layers of neurons are shaded differently, indicating that they are specifically trained for different aspects of a candidate identity network. For example, and as shown in FIG. 4, the input layer 403 is specific for all information about an identity network.

Within the hidden layers 405 are layer 406, which contains neurons that are designed to evaluate the overall trustworthiness of the candidate identity network, layer 408, which contains neurons that are designed to evaluate the validity of the identity records in the candidate network, and layer 410, which contains neurons that are designed to evaluate standard variables that are associated with criteria that describe a requester of an identity profile, as described above.

Thus, in the embodiment of DNN 424 shown in FIG. 4, layer 406 (i.e., that manipulates data related to the overall trustworthiness of the candidate identity network) controls the inputs to the neurons in layer 408 (which are devoted to the validity of the identity records in the candidate identity network). The outputs of neurons from layer 408 then control the inputs to the neurons in layer 410 (which are designed to evaluate standard variables that are associated with criteria that describe a requester of an identity profile).

As such, in the DNN 424 depicted in FIG. 4, the overall trustworthiness of the candidate identity network has the greatest impact in determining whether the candidate identity network is appropriate for onboarding into the set of identity networks 210a-210n, and the validity of the identity records in the candidate identity network and the standard variables have decreasing levels of impact on whether the candidate identity network is appropriate for onboarding into the set of identity networks 210a-210n. That is, if the candidate identity network is not trustworthy (as determined by layer 406), then the validity of the identity records in the candidate identity network must be very high, in order to overcome the low values that are output from layer 406. Similarly, if the validity of the identity records is highly questionable, then the need for a particular identity according to certain factors (standard variable) must be very high, in order to justify the use of the candidate identity network.

In another embodiment of the present invention, the layer 406 is devoted to the validity of the identity records in the candidate identity network, layer 408 is devoted to the overall trustworthiness of the candidate identity network, and layer 410 is devoted to the standard variables, thus giving a greatest impact in the decision on whether to onboard the candidate identity network to the overall trustworthiness of the candidate identity network.

In another embodiment of the present invention, the input layer 406 is devoted to the standard variables, layer 408 is devoted to the overall trustworthiness of the candidate identity network, and layer 410 is devoted to the validity of the identity records in the candidate identity network, thus giving a greatest impact in the decision on whether to onboard the candidate identity network to the standard variables.

In another embodiment of the present invention, neurons devoted to the overall trustworthiness of the candidate identity network, the validity of the identity records in the candidate identity network, and the standard variables are interspersed among the hidden layers 405, thus giving equal impact in the decision on whether to onboard the candidate identity network to the standard variables of the user, the overall trustworthiness of the candidate identity network, and the validity of the identity records in the candidate identity network.

While FIG. 4 depicts an embodiment of the present invention in which a DNN is used to establish the confidence level of a candidate identity network, other types of reinforced learning are utilized in other embodiments of the present invention. That is, a DNN is trained using known training data, labels, etc. in a supervised manner in order to train the machine learning system 324 shown in FIG. 3. Alternatively, unsupervised reinforced learning, such as Q-learning, can be utilized in one or more embodiments of the present invention.

Unsupervised reinforced learning is an artificial intelligence that uses train and error to eventually find an optimal approach to a task. For example, if the task is to hit a ball with a bat, a robot will randomly swing a bat at the pitched ball. If the bat swings above or below the pitched ball, or if the bat swings before or after the pitched ball passes by the bat, then a negative value (i.e., a negative reward) is given to the actions of the bat, thus encouraging the robot not to take such a swing. However, if the bat "tips" the pitched ball, then a positive reward/value is given to the robot for this swing, thus encouraging the robot to take such a swing. If the bat connects solidly with the pitched ball, then an even higher reward/value is given to the robot for taking this swing, thus encouraging the robot even further to take such a swing.

A Q-learning reinforced learning system uses a Q-learning algorithm, which updates Q values of rewards when the actor/robot performs a certain action (swinging a bat) in a certain state (when the pitched ball is approaching the robot).

Figure 5:
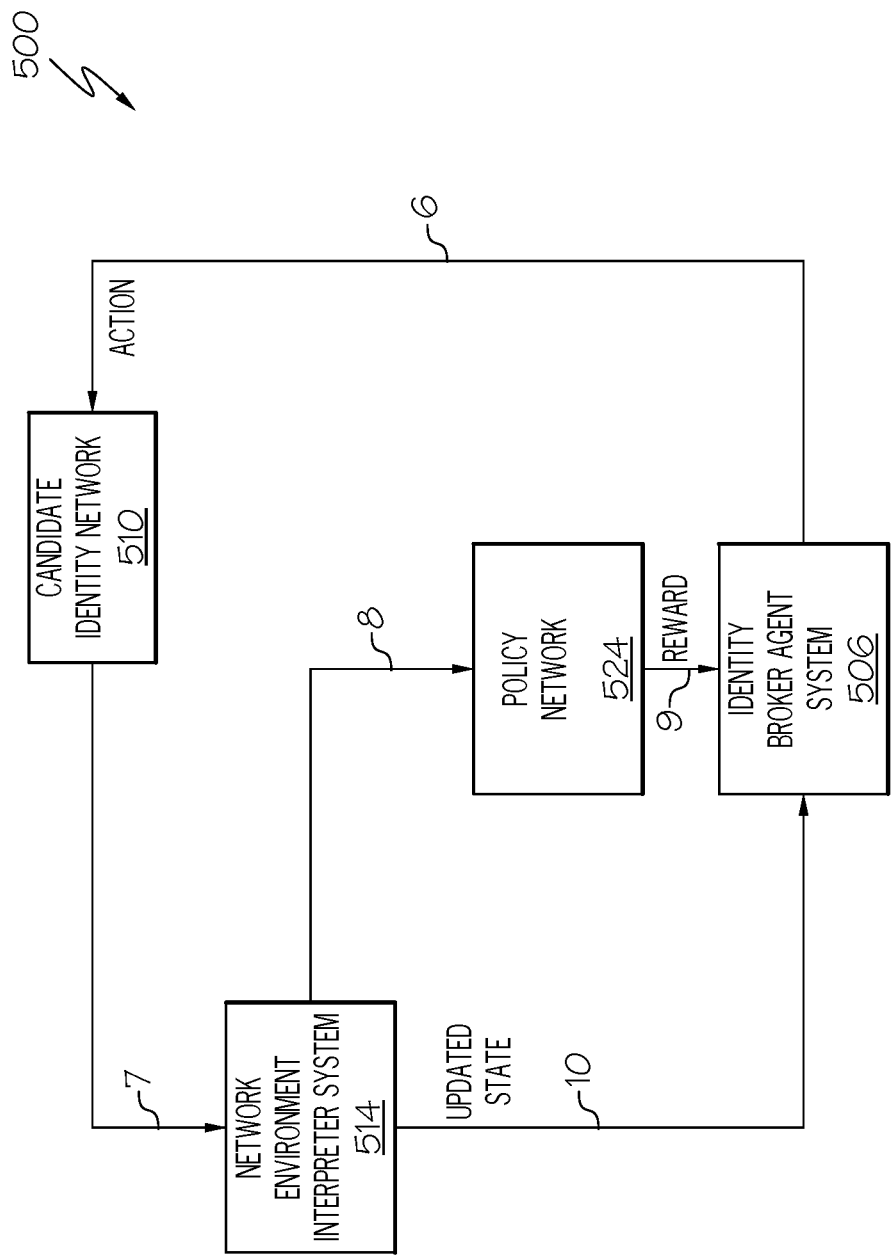
FIG. 5 depicts an exemplary unsupervised reinforcement learning system as used in one or more embodiments of the present invention.

With reference then to FIG. 5, an exemplary overview of an unsupervised learning environment 500, which performs the process shown in FIG. 3, is presented.

As shown in FIG. 5, the identity broker agent system 506, analogous to identity broker agent system 306 performs an action, as indicated by step 6. Examples of this action include, but are not limited to, interrogating a candidate identity network from candidate identity networks 510 (analogous to candidate identity network 310 shown in FIG. 3) to determine how well that particular candidate network from the candidate identity networks 510 meets the requirements described in the standard variables and the requirements for the overall trustworthiness of the identity networks and the validity of the identity records.

Based on what the identity broker agent system 506 is "looking for" in an identity network (step 6), that first/particular candidate identity network from the candidate identity networks 510 will send the network environment interpreter system 514 (analogous to the network environment interpreter system 314 shown in FIG. 3) details of the identity records it holds, including their attributes, attribute dependencies, graph organization of graphs depicting different identity records, etc., as shown in step 7.

The network environment interpreter system 514 then sends this information from the candidate identity network 510 to a policy network 524, which is a neural network used in unsupervised training. That is, a policy network does not use known training data, but rather uses trial and error until an optimal solution is found using rewards.

Thus, the network environment interpreter system 514 sends the description of the attributes of the first/particular candidate identity network from the candidate identity networks 510 to the policy network 524 in step 8. The policy network 524 determines how closely these attributes match what the identity broker agent system 506 is looking for in an identity network, and sends this information in the form of a "reward" (in which close matches receive positive rewards and poor matches receive negative rewards) to the identity broker agent system 506, as shown in step 9.

Furthermore, the updated state of the particular candidate network from the candidate identity networks 510 (i.e., the attributes of the particular candidate identity network from candidate identity networks 510 being evaluated) is sent to the identity broker agent system 506, as indicated by step 10.

Once all of the evaluation and information sharing steps 6-10 have been performed for a first candidate identity network from the candidate identity networks 510, steps 6-10 are repeated for each of the rest of the candidate identity networks 510 until all of the candidate identity networks 510 have been evaluated, or else until some predetermined quantity of the candidate identity networks 510 have been evaluated.

In an embodiment of the present invention, the identity broker agent system 506 includes a reinforced learning system (e.g., similar to policy network 524), which allows the identity broker agent system 506 to compare the different identity networks from the candidate identity networks 510, thus training the reinforced learning system in the identity broker agent system 506 to recognize an optimal identity network that meets the requirements of the identity broker agent system 506.

Figure 6:
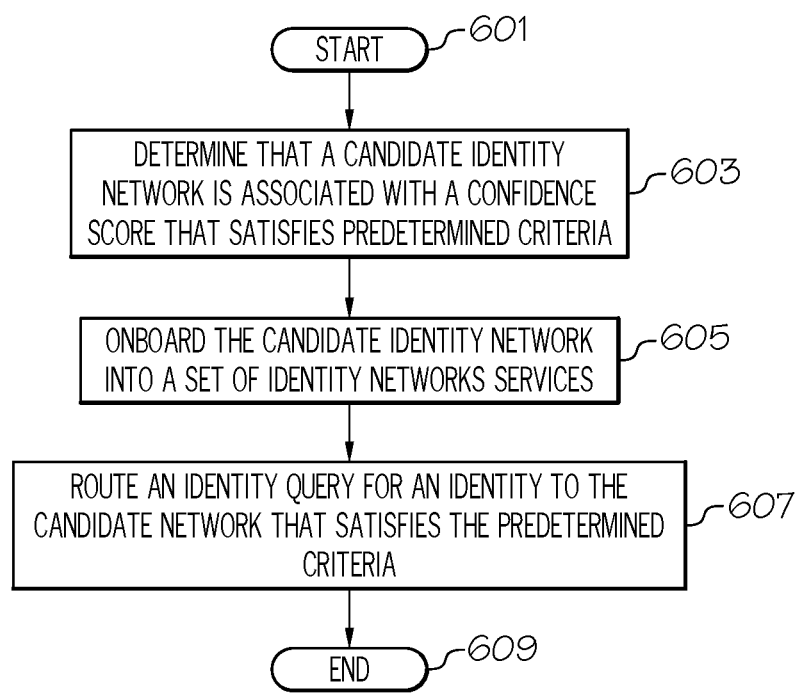
FIG. 6 is a high-level flow chart of one or more steps performed in accordance with one or more embodiments of the present invention.

With reference now to FIG. 6, a high-level flow chart of one or more elements of an exemplary method performed by the present invention is presented.

After initiator block 601, an identity broker (e.g., identity broker 214 shown in FIG. 2) determines that a candidate identity network is associated with a confidence score that satisfies predetermined criteria, as described in block 603. That is, a candidate identity network, which provides identity records/files, is deemed to satisfy the predetermined criteria set by the network specific variables and standard variables.

As described in block 605, responsive to determining that the candidate identity network is associated with the confidence score that satisfies the predetermined criteria, the identity broker onboards the candidate identity network into a set of identity networks services, such as identity networks 210*a*-210*n* shown in FIG. 2.

As described in block 607, the identity broker then routes an identity query (e.g., from client 202 and/or service provider 204 shown in FIG. 2) for an identity to the candidate identity network that satisfies the predetermined criteria.

The flow-chart ends at terminator block 609.

In an embodiment of the present invention, reinforcement learning is utilized to determine that the candidate identity network is associated with the confidence score that satisfies the predetermined criteria, and thus is to be onboarded into the set of identity networks services. That is, as described in FIGS. 3-4, machine learning determines that a particular candidate identity network meets the predetermined criteria, and thus is acceptable for being added to the set of identity networks services.

In an embodiment of the present invention, the network specific variables include a base confidence score, a similarity score, and a fraud score for each identity network in the set of identity network services. These scores are described in detail above.

In an embodiment of the present invention, the standard variables include variables that describe a state of the identity query, and wherein the state of the identity query is from a group consisting of a cost of connecting to the set of identity networks services, an importance of the query to the set of identity networks services, and a time requirement of the query. These factors are all described in detail above.

In an embodiment of the present invention, the standard variables describe a confidence in an identity of a sender of the identity query, as described above.

In an embodiment of the present invention, the identity broker contains a network environment interpreter (e.g., network environment interpreter system 314 shown in FIG. 3) that utilizes the network specific variables and that standard variables to describe environment data about identity networks in the set of identity networks services. The method thus further comprises creating a policy for routing an identity request to a particular identity network in the set of identity networks services based on the environment data. That is, the network environment interpreter system 314 and/or the identity broker agent system 306 creates a policy in which identity queries are routed to a particular identity network that best matches the network specific variables and that standard variables that are required by the policy.

Thus, as described herein, one or more embodiments of the present invention onboard a candidate identity network based on a confidence score for the candidate identity network exceeding a predefined level. As described herein this confidence score is based on a combination of network specific variables and standard variables.

As such, the routing of queries for identities is based on the confidence score at broker. That is, queries are routed to the network having higher confidence score than other networks. This higher confidence score is based on the overall features of the identity networks (e.g., past history of providing accurate identity records, past history of fraud, etc.), and/or the features of specific identity records within the identity networks (e.g., if a particular identity record in a first identity network matches the same identity record in a second identity network, whether that particular identity record has satisfied the need of prior identity record requests, etc.).

In an embodiment of the present invention, an identity query is dropped if the identity record profiles and/or the overall confidence score for the identity networks have lower confidence score than a predefined threshold. That is, if the identity networks in the set of identity networks services and/or the individual identity records within these identity networks are unreliable, then the query for an identity record is simply dropped, and the requester is so notified.

In an embodiment of the present invention, if an update/delete query results in causing an identity network to have its confidence score lowered, then this update/delete query is dropped and/or throttled. For example, assume that the identity broker 206 shown in FIG. 2 is directed (e.g., by client 202) to drop or alter an identity record in identity network 210*a*. However, identity broker 206 contains logic that states that if the number of identity records in an identity network decreases (i.e., an identity record is dropped), then the delete query is dropped. Furthermore, if a particular identity record is altered to add data that has been verified (e.g., matches data in other identity networks) and data that has not been verified (e.g., is not found in any of the other identity networks), then only the data that has been verified is added to that identity record (i.e., the alteration of the identity record is throttled).

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
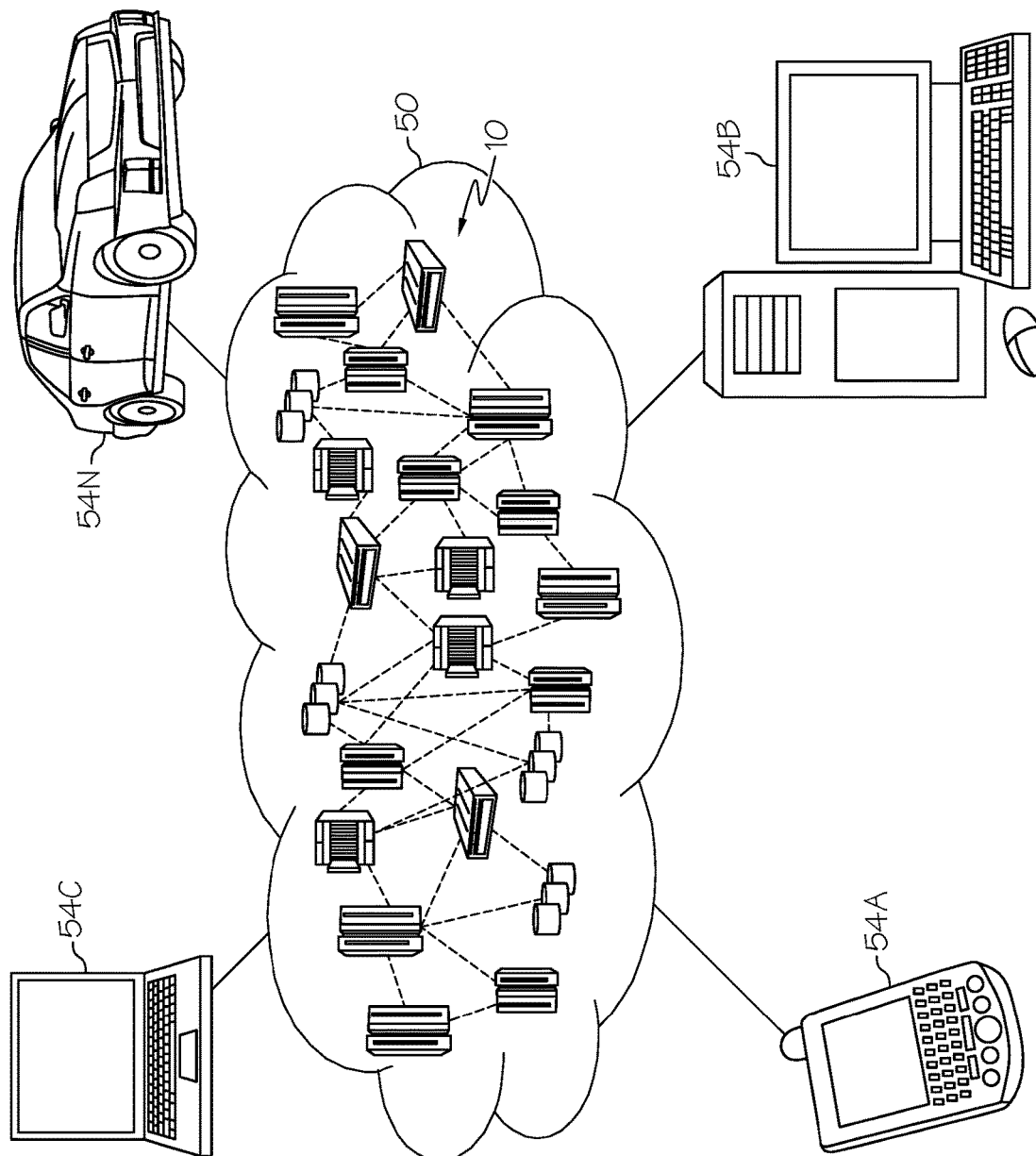
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
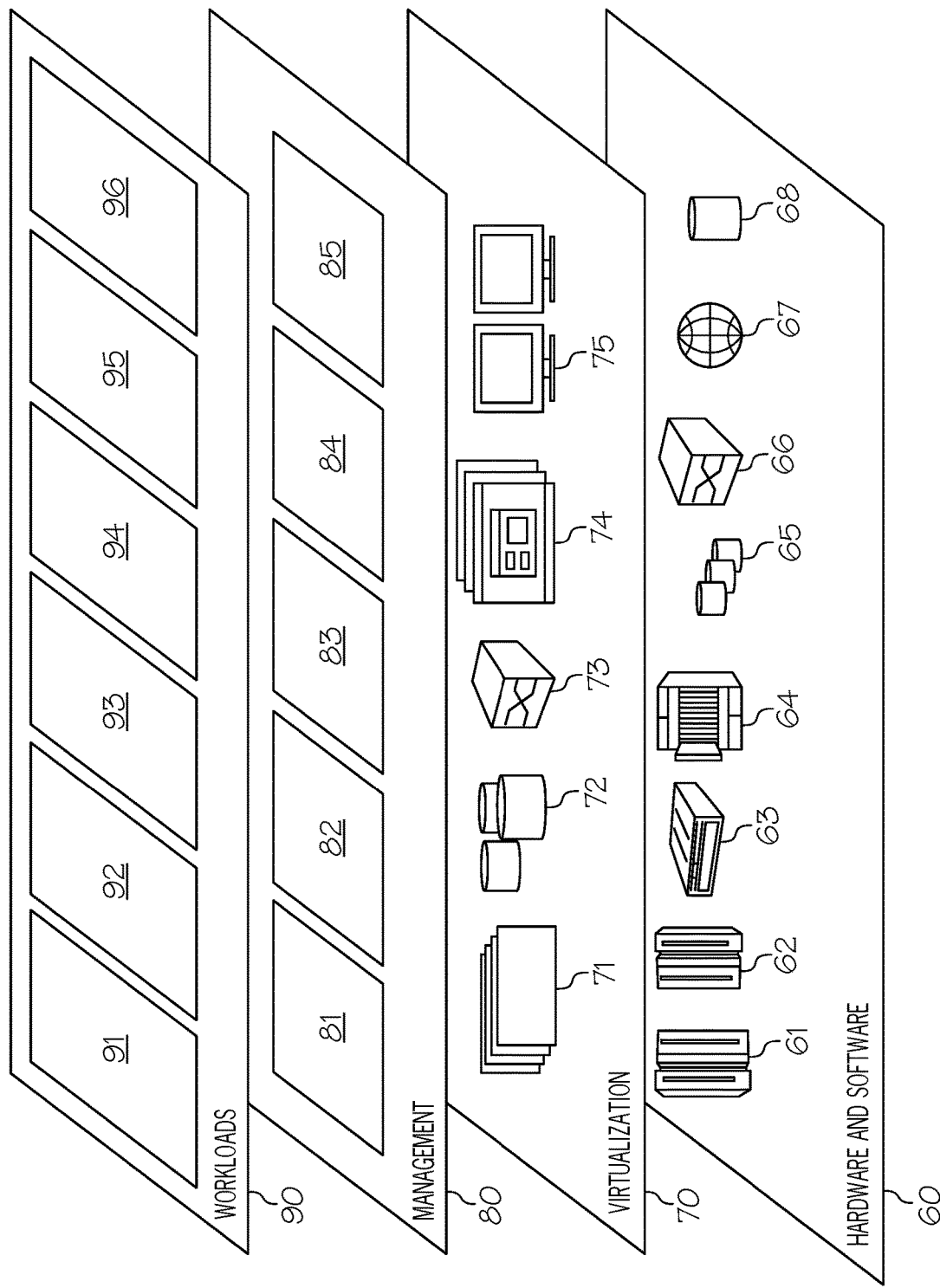
FIG. 8 depicts abstraction model layers of a cloud computer environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and machine learning and identity network onboarding processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising: determining that a candidate identity network is associated with a confidence score that satisfies predetermined criteria, wherein the confidence score describes how confident a system is about an accuracy of identities that are shared between identity networks for a particular user, and wherein the confidence score is based on network specific variables and standard variables, wherein the network specific variables include a base confidence score, a similarity score, and a fraud score for each identity network in the set of identity networks services, wherein the base confidence score indicates a likelihood that a particular identity network is certain that it contains an accurate identity profile for the particular user, wherein the similarity score is based on how similar an identity profile for a particular user is between the different identity networks, and wherein the fraud score is based on a fraud record of how accurate identities provided by each of the candidate identity networks are; responsive to determining that the candidate identity network is associated with the confidence score that satisfies the predetermined criteria, onboarding the candidate identity network into a set of identity networks services; and routing, by an identity broker, an identity query for an identity of the particular user to the candidate identity network that satisfies the predetermined criteria.

2. The method of claim 1, further comprising: utilizing a deep neural network to determine that the candidate identity network is associated with the confidence score that satisfies the predetermined criteria, wherein a first set of neurons in the deep neural network are devoted to evaluating an overall trustworthiness of the candidate identity network, wherein a second set of neurons in the deep neural network are devoted to evaluating a validity of identity records in the candidate identity network, wherein a third set of neurons in the deep neural network are devoted to evaluating the standard variables, and wherein the first, second, and third set of neurons are interspersed among hidden layers in the deep neural network.

3. The method of claim 1, wherein the standard variables include variables that describe a state of the identity query, and wherein the state of the identity query is based on a cost of connecting to the set of identity networks services, an importance of the query to the set of identity networks services, and a time requirement of the query, wherein the cost of connecting to the set of identity networks services is a monetary cost of an identity broker connecting to one or more of the candidate identity networks, wherein the importance of the query to the set of identity networks services is based on a type of activity that is being performed on behalf of the particular user, and wherein the time requirement of the query indicates how time sensitive a need for an identity of the particular user is.

4. The method of claim 1, wherein the standard variables describe a confidence in an identity of a sender of the identity query, wherein the sender of the identity query is the particular user, and wherein the confidence in the identity of the sender of the identity query describes how confident an identity broker is about the sender of the identity query and the particular user being a same person.

5. The method of claim 1, wherein the identity broker contains a network environment interpreter that utilizes the network specific variables and that standard variables to describe environment data about identity networks in the set of identity networks services, and wherein the method further comprises: creating a policy for routing an identity request to a particular identity network in the set of identity networks services based on the environment data.

6. A computer program product comprising a computer readable storage medium having program code embodied therewith, wherein the computer readable storage medium is not a transitory signal per se, and wherein the program code is readable and executable by a processor to perform a method comprising: determining that a candidate identity network is associated with a confidence score that satisfies predetermined criteria, wherein the confidence score describes how confident a system is about an accuracy of identities that are shared between identity networks for a particular user, and wherein the confidence score is based on network specific variables and standard variables, wherein the network specific variables include a base confidence score, a similarity score, and a fraud score for each identity network in the set of identity networks services, wherein the base confidence score indicates a likelihood that a particular identity network is certain that it contains an accurate identity profile for the particular user, wherein the similarity score is based on how similar an identity profile for a particular user is between the different identity networks, and wherein the fraud score is based on a fraud record of how accurate identities provided by each of the candidate identity networks are; responsive to determining that the candidate identity network is associated with the confidence score that satisfies the predetermined criteria, onboarding the candidate identity network into a set of identity networks services; and routing an identity query for an identity of the particular user to the candidate identity network that satisfies the predetermined criteria.

7. The computer program product of claim 6, wherein the method further comprises: utilizing a deep neural network to determine that the candidate identity network is associated with the confidence score that satisfies the predetermined criteria, wherein a first set of neurons in the deep neural network are devoted to evaluating an overall trustworthiness of the candidate identity network, wherein a second set of neurons in the deep neural network are devoted to evaluating a validity of identity records in the candidate identity network, wherein a third set of neurons in the deep neural network are devoted to evaluating the standard variables, wherein the first set of neurons are in a first layer of hidden layers of the deep neural network, wherein the second set of neurons are in a second layer of the hidden layers of the deep neural network, and wherein the third set of neurons are in a third layer of the hidden layers of the deep neural network.

8. The computer program product of claim 6, wherein the network specific variables include a base confidence score, a similarity score, and a fraud score for each identity network in the set of identity networks services.

9. The computer program product of claim 6, wherein the standard variables include variables that describe a state of the identity query, and wherein the state of the identity query is from a group consisting of a cost of connecting to the set of identity networks services, an importance of the query to the set of identity networks services, and a time requirement of the query.

10. The computer program product of claim 6, wherein the standard variables describe a confidence in an identity of a sender of the identity query.

11. The computer program product of claim 6, wherein the standard variables describe a confidence in interpreting what type of identity is being requested by a sender of the identity query.

12. The computer program product of claim 6, wherein an identity broker contains a network environment interpreter that utilizes the network specific variables and that standard variables to describe environment data about identity networks in the set of identity networks services, and wherein the method further comprises: creating a policy for routing an identity request to a particular identity network in the set of identity networks services based on the environment data.

13. The computer program product of claim 6, wherein the program code is provided as a service in a cloud environment.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising: determining that a candidate identity network is associated with a confidence score that satisfies predetermined criteria, wherein the confidence score describes how confident a system is about an accuracy of identities that are shared between identity networks for a particular user, and wherein the confidence score is based on network specific variables and standard variables, wherein the network specific variables include a base confidence score, a similarity score, and a fraud score for each identity network in the set of identity networks services, wherein the base confidence score indicates a likelihood that a particular identity network is certain that it contains an accurate identity profile for the particular user, wherein the similarity score is based on how similar an identity profile for a particular user is between the different identity networks, and wherein the fraud score is based on a fraud record of how accurate identities provided by each of the candidate identity networks are; responsive to determining that the candidate identity network is associated with the confidence score that satisfies the predetermined criteria, onboarding the candidate identity network into a set of identity networks services; and routing an identity query for an identity of the particular user to the candidate identity network that satisfies the predetermined criteria.

15. The computer system of claim 14, wherein the method further comprises: utilizing a deep neural network to determine that the candidate identity network is associated with the confidence score that satisfies the predetermined criteria, wherein a first set of neurons in the deep neural network are devoted to evaluating the standard variables, wherein a second set of neurons in the deep neural network are devoted to evaluating an overall trustworthiness of the candidate identity network, wherein a third set of neurons in the deep neural network are devoted to evaluating a validity of identity records in the candidate identity network, wherein the first set of neurons are in a first layer of hidden layers of the deep neural network, wherein the second set of neurons are in a second layer of the hidden layers of the deep neural network, and wherein the third set of neurons are in a third layer of the hidden layers of the deep neural network.

16. The method of claim 1, further comprising: detecting that an identity record has been deleted from the candidate identity network; and in response to detecting that the identity record has been deleted from the candidate identity network, cancelling the identity query.

17. The method of claim 1, further comprising: determining that the confidence score no longer satisfies the predetermined criteria; and in response to determining that the confidence score no longer satisfies the predetermined criteria, cancelling the identity query.

18. The method of claim 1, further comprising: determining that the set of identity networks services contains only a single identity network service; and in response to determining that the set of identity networks services contains only the single identity network service, cancelling the identity query.

19. The computer system of claim 14, wherein the program code is provided as a service in a cloud environment.

* * * * *